(12) United States Patent
Tsai (10) Patent No.: US 11,427,301 B2
(45) Date of Patent: Aug. 30, 2022

(54) LOAD RELIEVING CARRIER BEAM

(71) Applicant: The Boeing Company, Chicago, IL (US)

(72) Inventor: Kevin R. Tsai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 141 days.

(21) Appl. No.: 16/900,630

(22) Filed: Jun. 12, 2020

(65) Prior Publication Data

US 2021/0387716 A1 Dec. 16, 2021

(51) Int. Cl.
*B64C 9/20* (2006.01)
*B64C 13/30* (2006.01)
*B64C 9/02* (2006.01)

(52) U.S. Cl.
CPC .................. *B64C 9/20* (2013.01); *B64C 9/02* (2013.01); *B64C 13/30* (2013.01)

(58) Field of Classification Search
CPC .. B64C 9/20; B64C 9/02; B64C 13/30; B64C 3/48
See application file for complete search history.

(56) References Cited

U.S. PATENT DOCUMENTS

| | | | |
|---|---|---|---|
| 6,116,539 A * | 9/2000 | Williams | B64C 3/10 244/46 |
| 6,544,357 B1 * | 4/2003 | Hehmann | C23C 14/14 148/420 |
| 7,753,313 B1 * | 7/2010 | Barr | B64C 9/24 244/123.1 |
| 2001/0004096 A1 * | 6/2001 | Entelmann | B64C 1/1461 244/119 |
| 2019/0118932 A1 * | 4/2019 | Princen | B64C 9/00 |
| 2019/0168872 A1 * | 6/2019 | Grubb | B64C 1/26 |
| 2020/0047874 A1 * | 2/2020 | Bowers | B64C 3/50 |
| 2021/0061442 A1 * | 3/2021 | Tsai | B64C 13/30 |
| 2021/0086904 A1 * | 3/2021 | Tsai | B64C 9/16 |
| 2021/0114714 A1 * | 4/2021 | Tsai | B64C 9/06 |

* cited by examiner

*Primary Examiner* — Rodney A Bonnette
(74) *Attorney, Agent, or Firm* — Felix L. Fischer (57) ABSTRACT

A flap support mechanism includes a carrier beam on which a flap is mounted. The carrier beam is rotatably mounted at a fixed rotational axis and has a pair of flanges, each flange having an aperture, and a channel extending aft from the pair of flanges. A fuse pin is received through the aperture in each flange. A coupler link is attached to an actuator at a first end and pivotally engaged to the carrier beam by the fuse pin. Extension of the coupler link by the actuator rotates the carrier beam from a stowed position to a deployed position. Responsive to a moment induced on the flap and carrier beam by a ground contact load, the fuse pin is frangible to shear releasing the coupler link to translate into the channel.

20 Claims, 12 Drawing Sheets

FIG. 11

LOAD RELIEVING CARRIER BEAM

BACKGROUND INFORMATION

Field

This disclosure relates generally to the field of aircraft flap systems and, more particularly to a flap deployment system having a flap carrier beam with a hollow channel to receive a coupler link upon fracture of a fuse pin.

Background

Aircraft employ flaps which deploy to increase camber and chord of the wings for enhanced aerodynamic efficiency in take-off and landing. Various mechanical arrangements have been developed to deploy the flaps from retracted to extended positions. Flap supports typically extend below the lower surface of the wing and deployment of the flaps extend portions of the flap and flap support elements below the wing. Consequently, conditions may exist outside normal operations where the flap supports may contact the ground. The wing structure includes fuel tanks and other complex systems elements. Flap supports are therefore fusible or frangible, to allow flap system components to react to such ground contact in a controlled manner which does not compromise the surrounding primary wing structure and integrity of the integral wing fuel tanks. In many cases providing the frangible elements of the flap support require complex structures or multiple attachment points. It is therefore desirable to provide a simplified force relief system.

SUMMARY

Exemplary implementations of a flap support mechanism include a carrier beam on which a flap is mounted. The carrier beam is rotatably mounted at a fixed rotational axis and has a pair of flanges, each flange having an aperture, and a channel extending aft from the pair of flanges. A fuse pin is received through the aperture in each flange. A coupler link is attached to an actuator at a first end and pivotally engaged to the carrier beam by the fuse pin. Extension of the coupler link by the actuator rotates the carrier beam from a stowed position to a deployed position. Responsive to a moment induced on the flap and carrier beam by a ground contact load, the fuse pin is frangible to shear releasing the coupler link to translate into the channel.

The exemplary implementations provide a method for relieving load on a flap carrier beam. A flap is mounted on a carrier beam and the carrier beam is rotatably mounted at a fixed rotational axis, the carrier beam having a pair of flanges each flange having an aperture, and a channel extending aft from the pair of flanges. A coupler link is attached to an actuator at a first end. The coupler link is pivotally engaged to the carrier beam with a fuse pin. The coupler link is extended with the actuator to rotate the carrier beam from a stowed position to a deployed position. The fuse pin is sheared responsive to a moment induced on the flap and carrier beam by a ground contact load. The coupler link is released and translates into the channel.

BRIEF DESCRIPTION OF THE DRAWINGS

The features, functions, and advantages that have been discussed can be achieved independently in various implementations or may be combined in yet other implementations further details of which can be seen with reference to the following description and drawings.

DETAILED DESCRIPTION

The implementations described herein provide a carrier beam rotatably carried by a flap support having a pair of flanges coupled by a fuse pin to a coupler link. The fuse pin is configured to shear and enable the coupler link to translate through a channel in the carrier beam in response to a load applied to the flap that creates a moment inducing a sufficient force to shear the pin, thereby preventing the coupler link from damaging the wing structure.

Figure 1A:
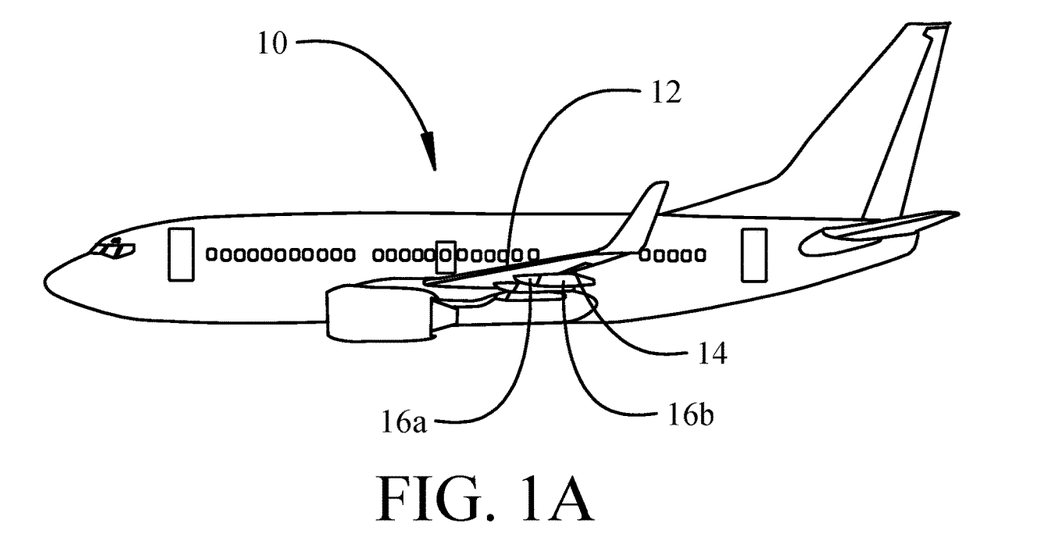
FIG. 1A is a representation of an aircraft in which the implementations disclosed herein may be employed.
Figure 1B:
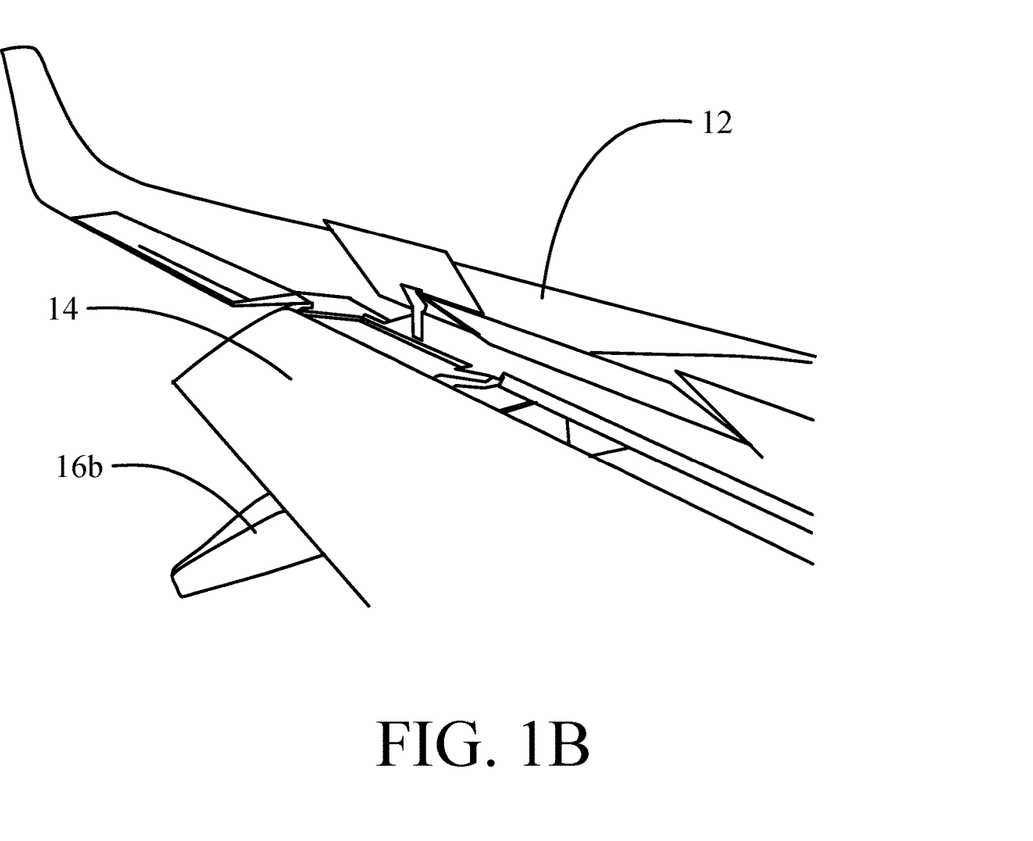
FIG. 1B is a top view of the wing and flaps of FIG. 1A.
Figure 1C:
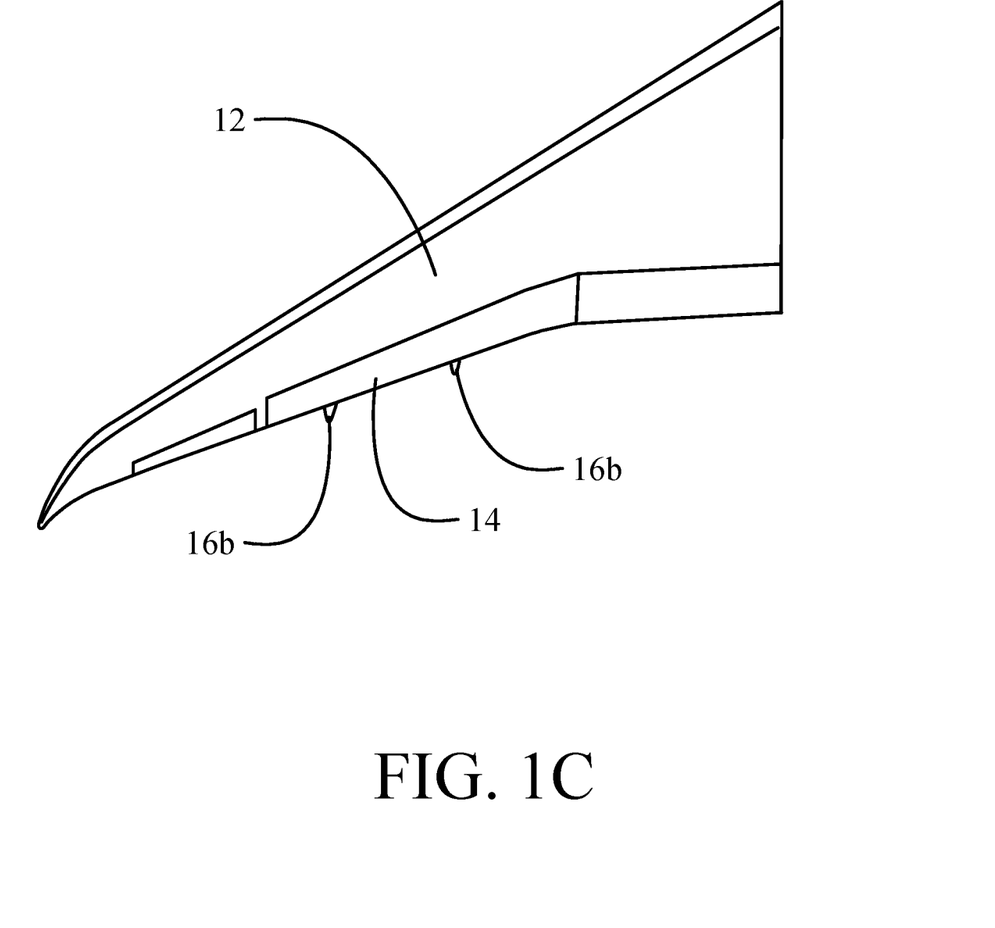
FIG. 1C is pictorial representation of the aircraft wing with the flaps and air brakes deployed.

Referring to the drawings, FIGS. 1A, 1B and 1C depict an aircraft 10 having a wing 12 with a system of operating flaps 14. The flaps 14 are engaged to the wing 12 at multiple attachment points with flap supports 15a, 15b at least partially housed within fixed fairings 16a and movable fairings 16b. The flaps 14 are deployed to enhance aerodynamic performance during takeoff and landing with a flap actuation mechanism 18, to be described in greater detail subsequently, that causes the flaps 14 and movable fairings 16b to rotate rearward and downward relative to the wing 12 as seen in FIG. 1B.

Figure 2:
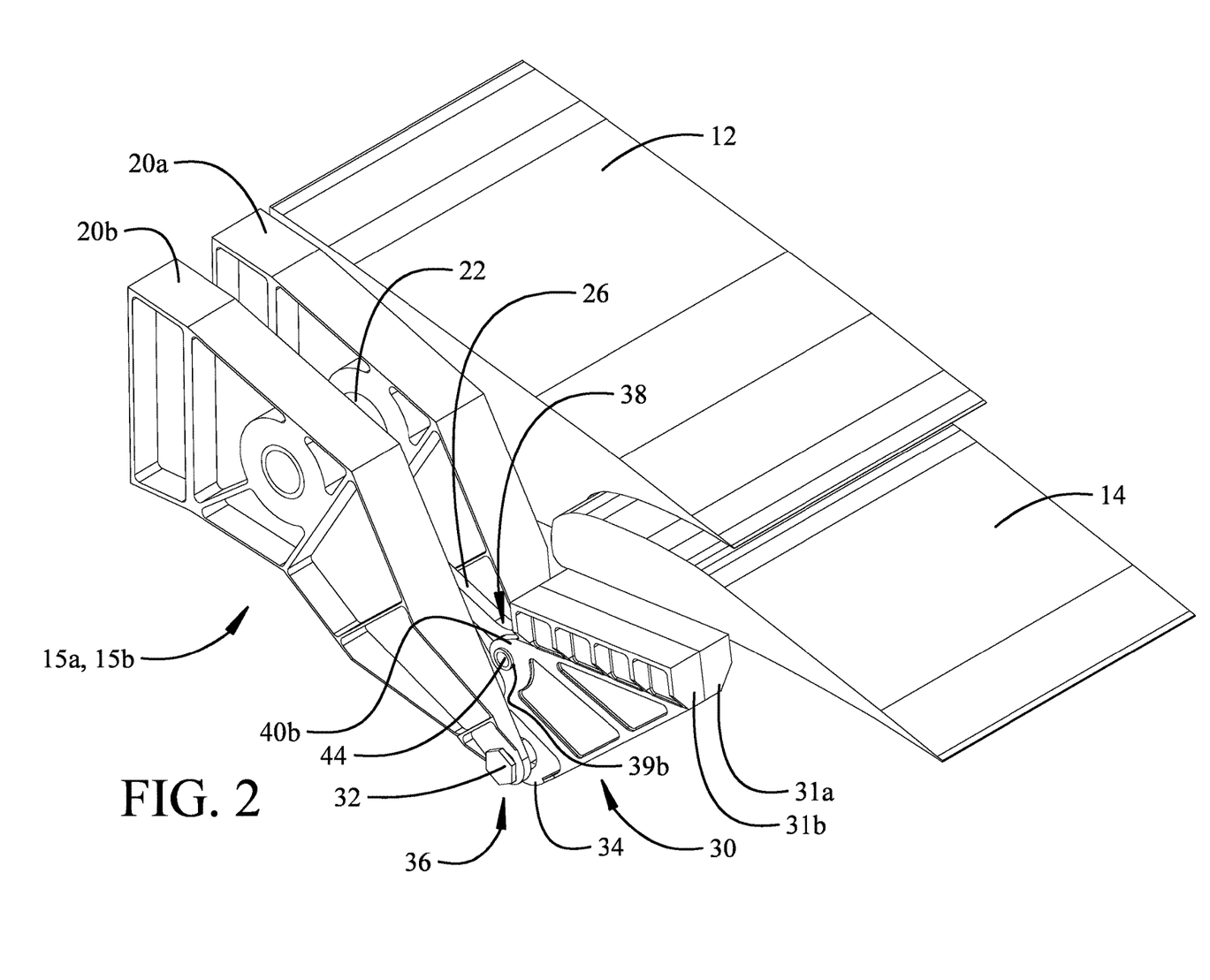
FIG. 2 is a rear pictorial view of a flap support with the fairings removed and the wing trailing edge and flap sectioned to show an example implementation of the load relieving carrier beam in the stowed position.
Figure 3:
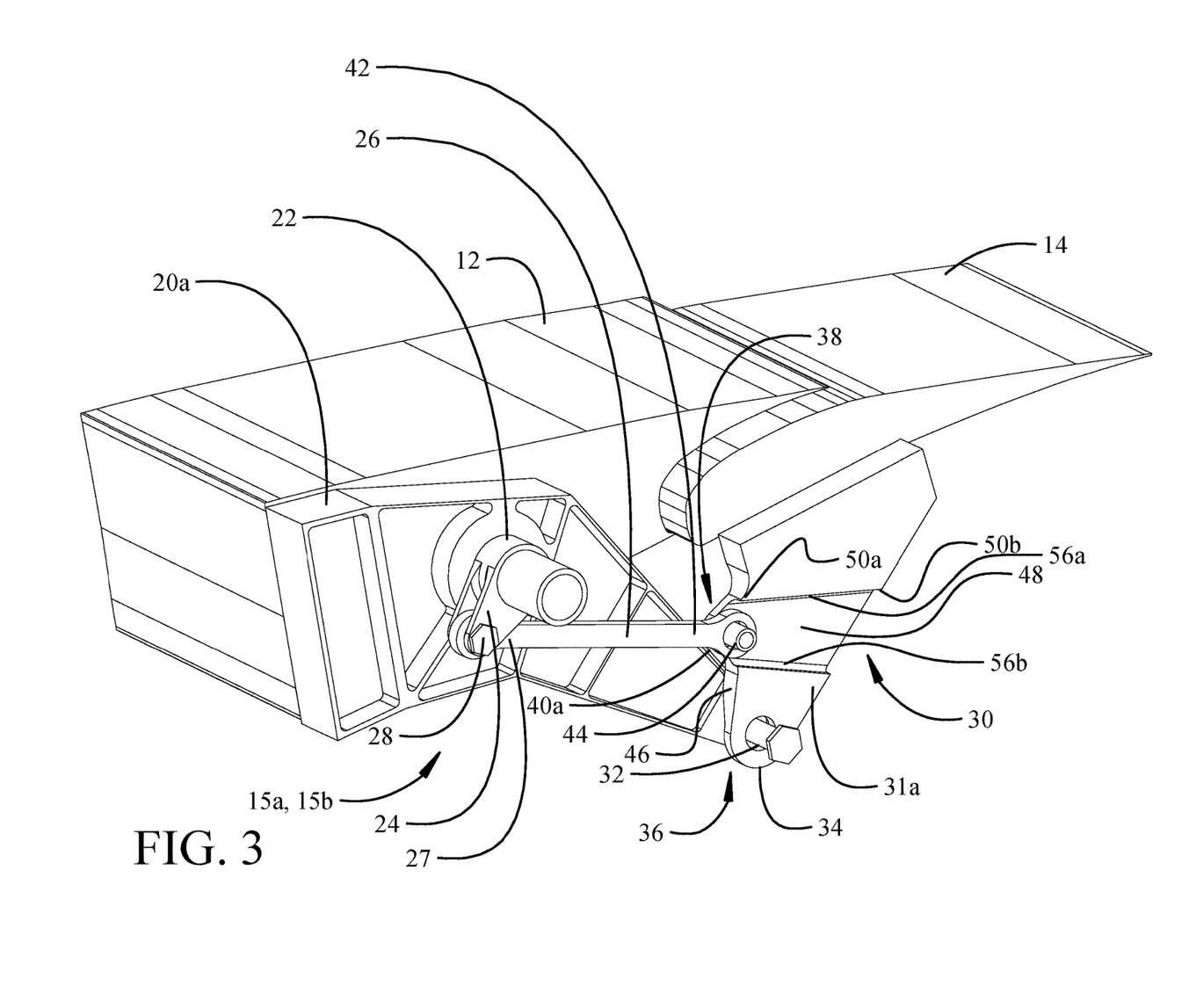
FIG. 3 is a front pictorial view of the flap support with carrier beam in the stowed position, the outboard rib of the flap support and the outboard plate of the carrier beam removed to display details of the actuation mechanism and carrier beam.
Figure 4:
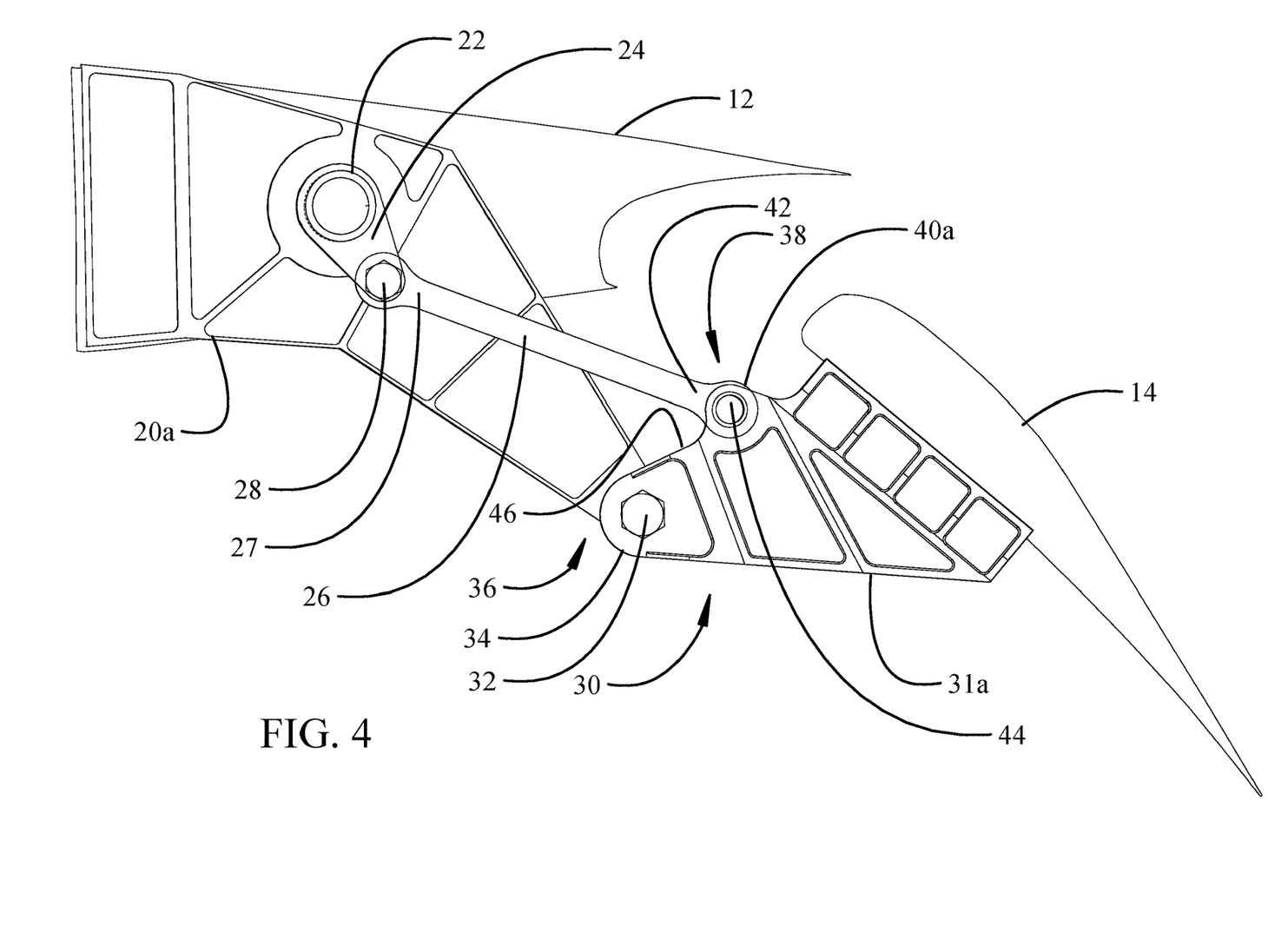
FIG. 4 is a side view of the flap support, the actuation mechanism and carrier beam in the deployed position.

FIGS. 2 and 3 show details of an implementation of the flap actuation mechanism 18. The flap supports 15a, 15b extending from the structure of the wing 12 each incorporate an inboard rib 20a and an outboard rib 20b. As seen in detail in FIG. 3, an actuator 22, with a drive arm 24 radially extending from the actuator to rotate upon activation of the actuator, is supported between the inboard and outboard ribs 20a, 20b. A coupler link 26 is pivotally attached at a leading end 27 to the drive arm 24 with a pivot pin 28 whereby rotation of the actuator rotates the drive arm 24 to extend the coupler link 26. A spherical bearing or similar engagement element in the leading end 27 of the coupler link 26 may be employed to accommodate angular alignment. The flap 14 is mounted on a carrier beam 30 and rotatably coupled through the flap support 15a, 15b to the wing 12. In the first example implementation, the carrier beam 30 has an inboard plate 31a joined to an outboard plate 31b. The dual plate arrangement of the carrier beam 30 provides a fail-safe capability for the overall flap assembly including the flap 14, flap support 15a, 15b and the carrier beam 30 should the inboard plate 31a or outboard plate 31b suffer a failure during service. The carrier beam 30 is rotatably attached with an axle 32 at a lower vertex 34 to a trailing clevis 36 formed by the inboard and outboard ribs 20a, 20b of the flap supports, the axle 32 defining a fixed axis of rotation relative to the wing 12 and flap support 15a, 15b for the carrier beam 30 and flap 14. Rotation of the carrier beam 30 about the axle 32 in response to extension of the coupler link 26 by rotation of the drive arm 24 upon activation of the actuator 22 deploys the flap 14 from a stowed position to a deployed position as seen in FIG. 4.

The coupler link 26 extends from the drive arm 24 to the carrier beam 30 and is pivotally attached to the carrier beam. In the example implementation, a carrier clevis 38 formed by a pair of flanges, an inboard bulbed flange 40a and an outboard bulbed flange 40b, extending from a forward surface 46 on the carrier beam 30 formed by the joined inboard plate 31a and outboard plate 31b, in the example implementations. The carrier clevis 38 pivotally engages a trailing end 42 of the coupler link 26 with a fuse pin 44 received through an inboard aperture 39a in the inboard bulbed flange 40a and an outboard aperture 39b in the outboard bulbed flange 40b. The inboard aperture 39a and outboard aperture 39b are aligned to form the carrier clevis 38. However, to accommodate angular offsets, a spherical bearing or similar element in the trailing end 42 of the coupler link 26 may be employed. In the implementation shown, the curvature of the inboard and outboard bulbed flanges 40a, 40b extending forward from the forward surface 46 of the carrier beam 30 provides clearance to avoid any impingement of the coupler link 26 on the forward surface 46 over the range of rotation of the flap 14 and carrier beam 30 between the stowed position and the deployed position.

Figure 5:
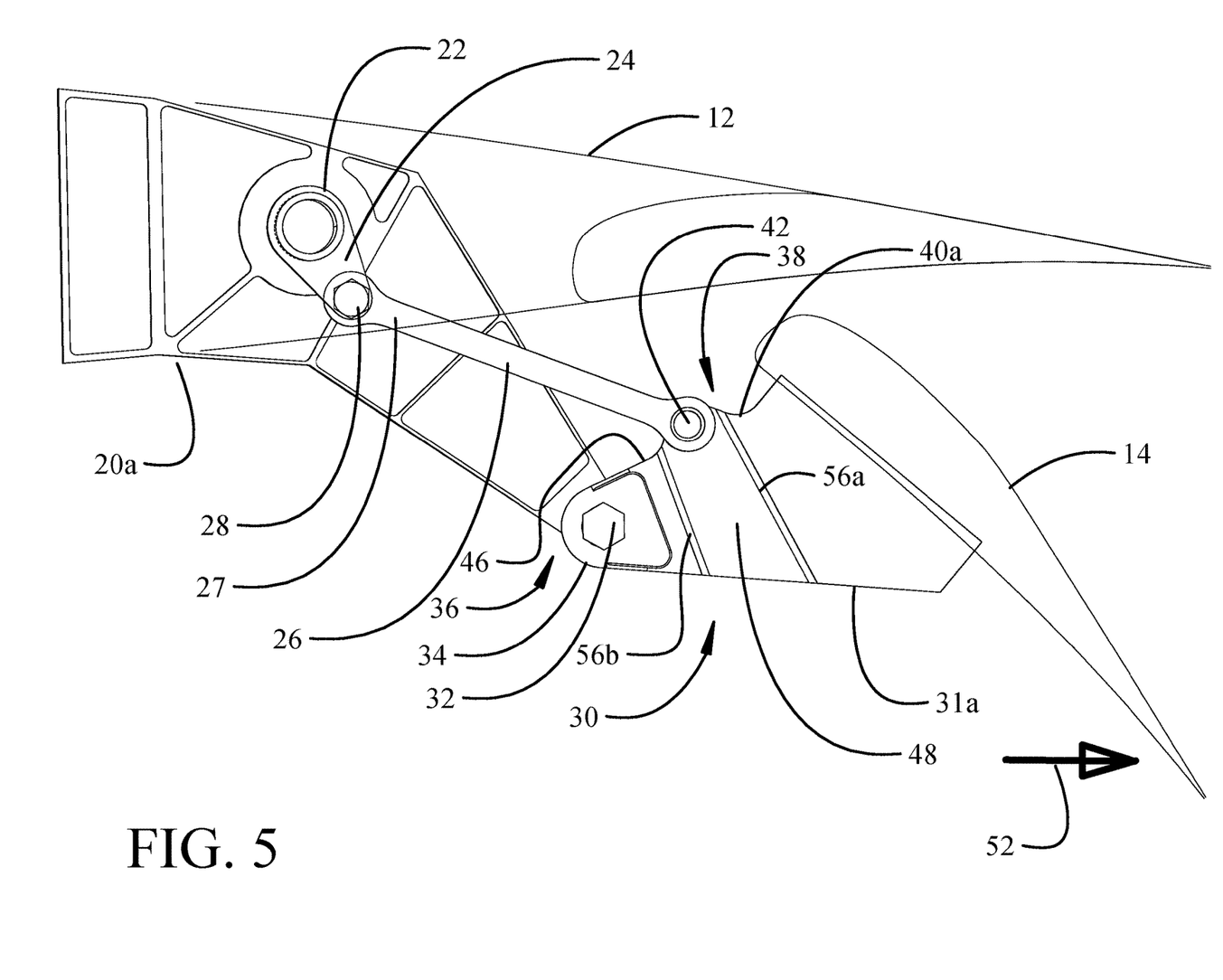
FIG. 5 is a side view of the flap support in the retracted position with the outboard rib of the flap support and the outboard plate of the carrier beam removed.

The carrier beam 30 incorporates an aperture or channel 48 extending from the carrier clevis 38 aft substantially in alignment with the coupler link 26 in the stowed or undeployed position as seen in FIGS. 3 and 5. The aperture or channel 48 may extend through the carrier beam 30, and the vertical extent of the aperture or channel 48 diverges from a forward end 50a to an aft end 50b. For the implementation shown in FIGS. 2-5, the carrier beam 30 may have the channel 48 machined, forged, molded or cast into the inboard and outboard plates 31a, 31b.

Figure 6:
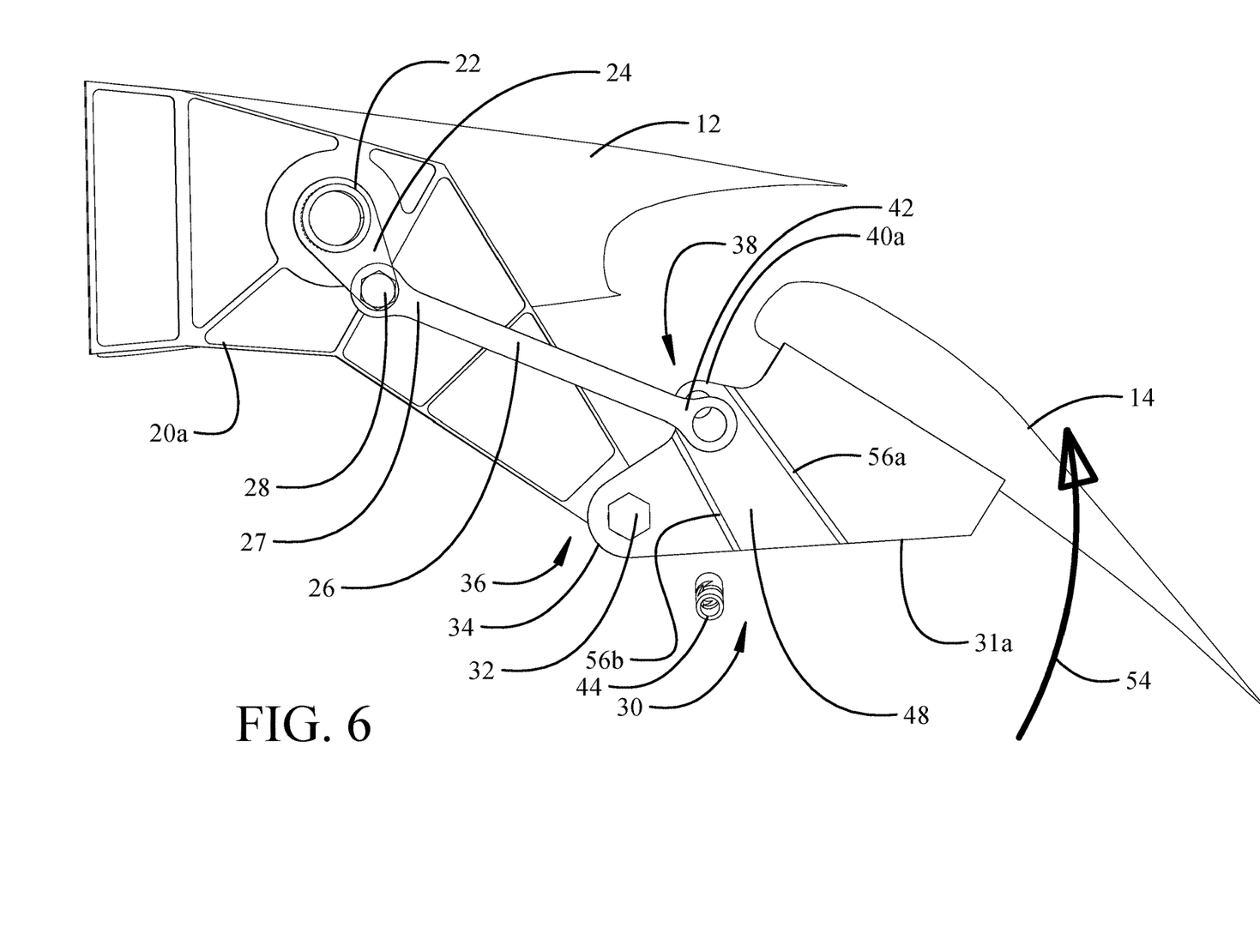
FIG. 6 is a side view of the flap support in the deployed position with the outboard rib of the flap support and the outboard plate of the carrier beam removed and the initial fracture of the fuse pin due to impact load.
Figure 7:
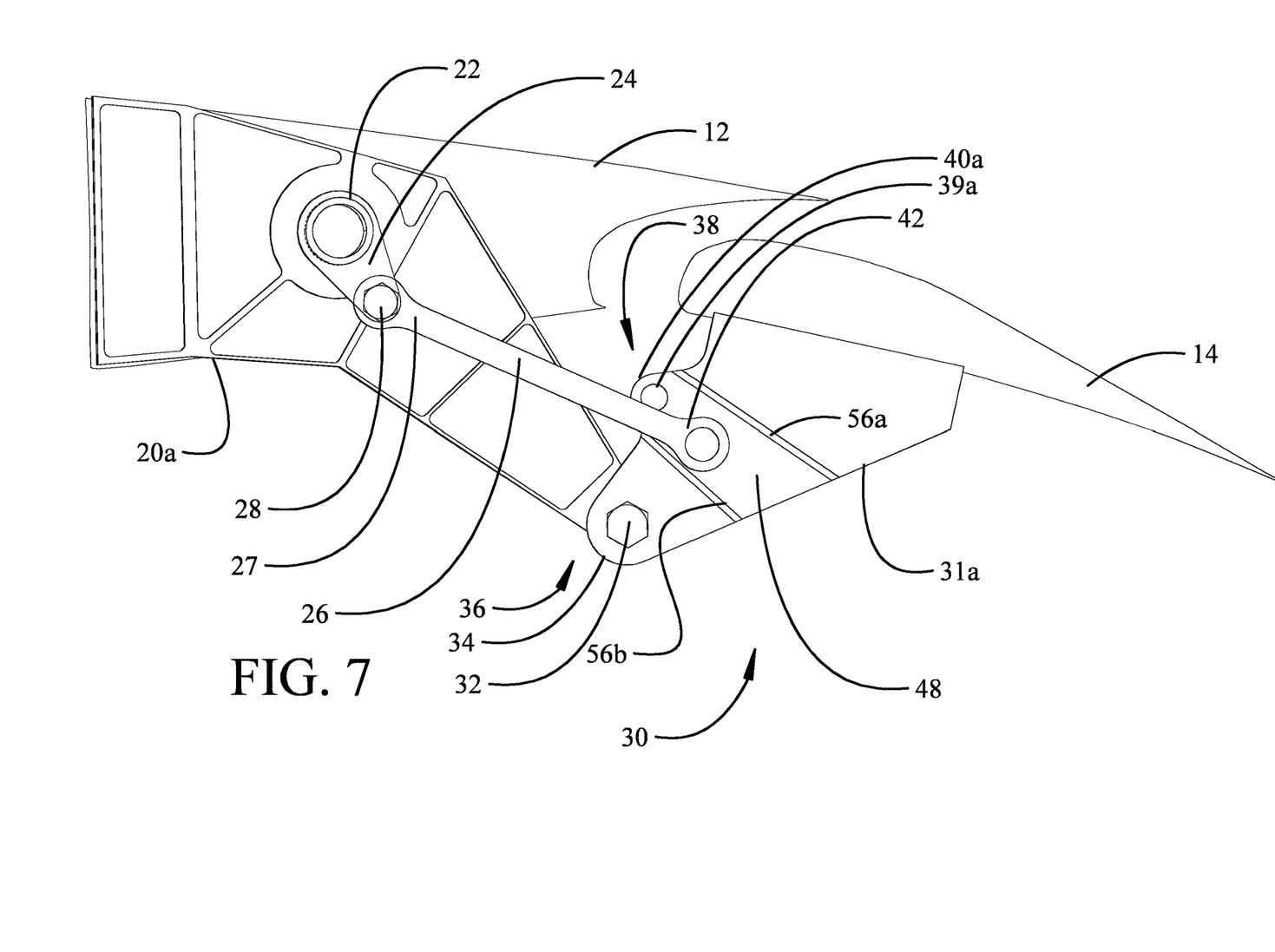
FIG. 7 is a side view of the flap support in a partially rotated position with the outboard rib of the flap support and the outboard plate of the carrier beam removed to show progression of the coupler link through the channel.
Figure 8:
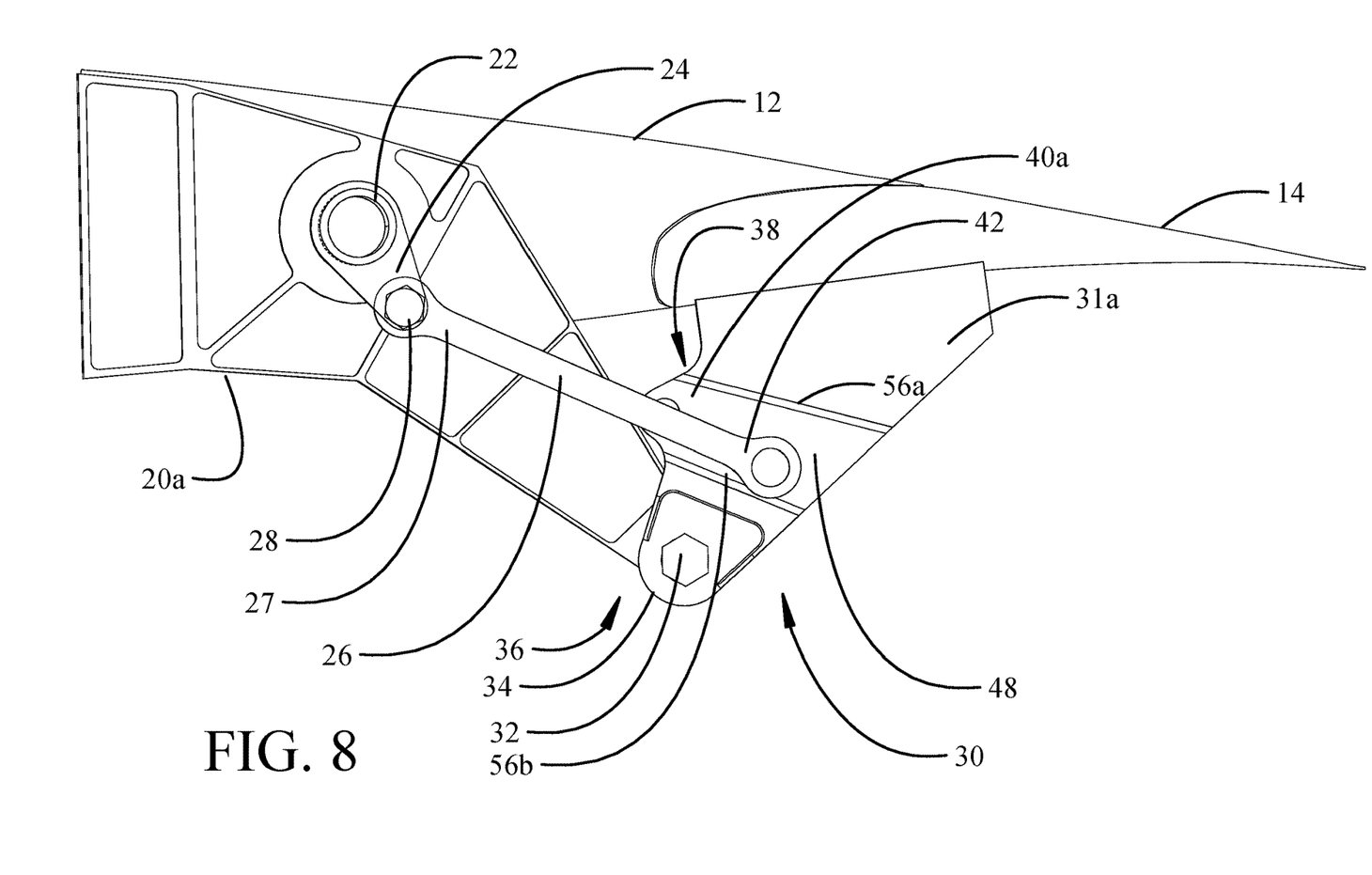
FIG. 8 is a side view of the flap support in a fully rotated position with the outboard rib of the flap support and the outboard plate of the carrier beam removed to show further progression of the coupler link through the channel.

The fuse pin 44 is configured to be frangible to shear under load corresponding to an unintended ground strike represented as load 52 on the flap 14 or carrier beam 30 in the deployed position as seen in FIG. 5. Such loading induces a moment about axle 32 creating a shear force on the fuse pin 44 in the carrier clevis 38. Upon shearing of the fuse pin 44 as seen in FIG. 6, the flap 14 and carrier beam 30 rotate about the axle 32 as indicated by arrow 54. The channel 48 is sized to receive the coupler link 26 and during continued rotation of the carrier beam 30, as seen in FIGS. 7 and 8, the coupler link 26 translates through the channel 48 as the channel rotates into alignment with the carrier beam 30 thereby avoiding compression forces in the coupler link 26. The diverging shape of the channel 48 allows clearance for angular offset of the coupler link 26 and the channel in the carrier beam 30. Further, the trailing end 42 of the coupler link 26 may contact either an upper surface 56a or a lower surface 56b of the channel 48 adapted to deflect the coupler link for continuing translation through the channel 48.

During rotation of the carrier beam 30 toward the stowed position after fracture of the fuse pin 44, the coupler link 26 rotates about pivot pin 28 to further avoid binding in the channel 48. The lack of compression force on the coupler link 26 enabled by fracture of the fuse pin 44 and translation of the trailing end 42 of the coupler link 26 through the channel 48 prevents fracture of the pivot pin 28 and minimizes any detrimental effect to the actuator 22, flap support 15a, 15b or other structure in the wing 12 due to rotation of the flap 14 and carrier beam 30.

Figure 9:
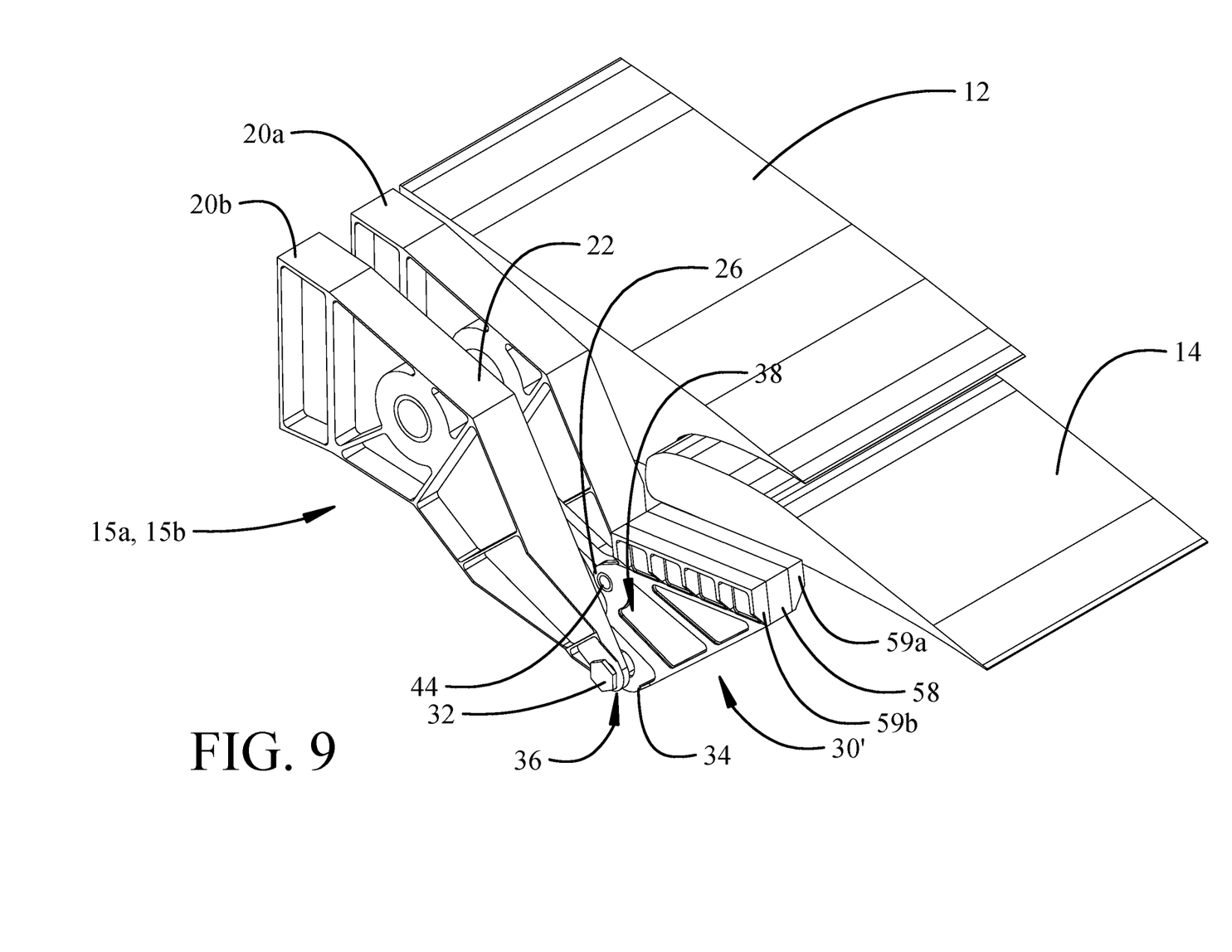
FIG. 9 is a rear pictorial view of the flap support with the fairings removed and the wing trailing edge and flap sectioned to show an second example implementation of a second implementation of the load relieving carrier beam in the retracted position.
Figure 10:
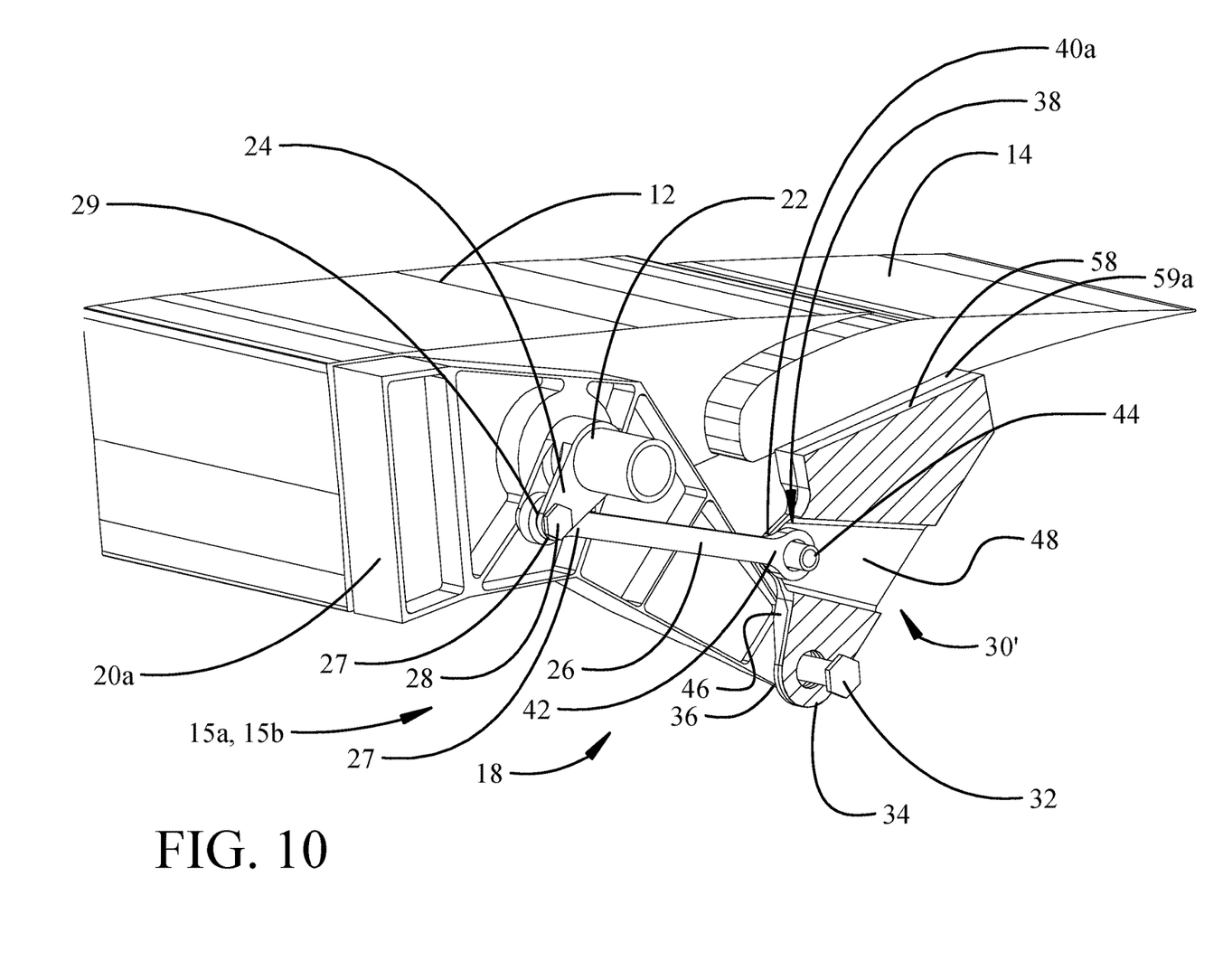
FIG. 10 is a front pictorial view of the second implementation with the outboard rib of the flap support removed and the carrier beam sectioned to display details of the actuation mechanism and second implementation of the carrier beam and, FIG. 11 is a flow chart of a method for passive auxiliary support of a flap for deployment using the exemplary implementations.

In an alternative implementation, the carrier beam 30' may be a monolithic structure or may be a multilayer structure with the channel 48 forged, machined, molded or cast into a central layer 58 and inboard and outboard outer layers 59a, 59b as seen in FIGS. 9 and 10. As in the initial implementation, a multilayer structure as shown in FIGS. 9 and 10 provides a fail-safe capability for the overall flap assembly including the flap 14, flap support 15a, 15b and the carrier beam 30 should a failure occur in one of the inboard layer 59a, central layer 58 or outboard layer 59b during service. Operation of the second implementation is substantially identical to that described for the first implementation.

Figure 11:
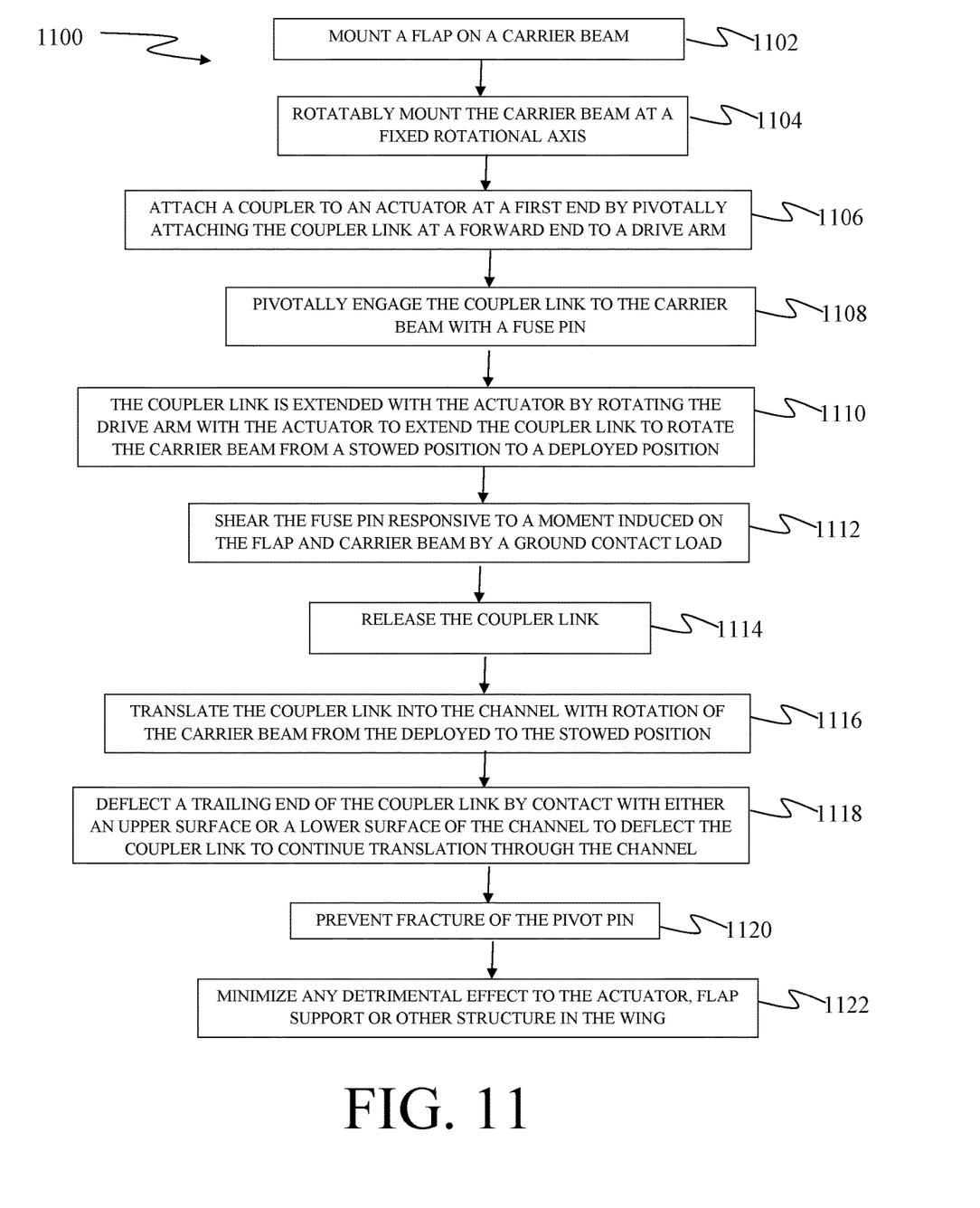

The implementations described provide a method 1100 of relieving load on a flap carrier beam as shown in FIG. 11. A flap is mounted on a carrier beam, step 1102. The carrier beam is rotatably mounted at a fixed rotational axis, step 1104. In an exemplary implementation, the carrier beam has a pair of flanges each flange having an aperture, and a channel extending aft from the pair of flanges. A lower vertex of the carrier beam is rotatably attached with an axle to a trailing clevis on a flap support extending from a wing, the axle providing the fixed rotational axis for rotation of the flap relative to the wing. A coupler link is attached to an actuator at a first end by pivotally attaching the coupler link at a forward end to a drive arm, step 1106, and the coupler link is pivotally engaged to the carrier beam with a fuse pin, step 1108. The coupler link is extended with the actuator by rotating the drive arm with the actuator to extend the coupler link to rotate the carrier beam from a stowed position to a deployed position, step 1110. The fuse pin is sheared responsive to a moment induced on the flap and carrier beam by a ground contact load, step 1112, and the coupler link is released, step 1114. The coupler link is translated into the channel with rotation of the carrier beam from the deployed to the stowed position after shearing of the fuse pin, step 1116, with the coupler link a pivoting bout a pivot pin at a forward end. A trailing end of the coupler link is deflected by contact with either an upper surface or a lower surface of the channel adapted to deflect the coupler link for continuing translation through the channel, step 1118. Fracture of the pivot pin is prevented, step 1120, thereby minimizing any detrimental effect to the actuator, flap support or other structure in the wing, step 1122.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide. As used herein the terms "outboard" and "inboard" and "upper" and "lower" are employed to describe relative positioning and other than for the specific implementations disclosed may be substituted with appropriate descriptors such as "first" and "second", "top" and "bottom" or "right" and "left" depending on orientation of actual implementation.

What is claimed is:

1. A flap actuation mechanism comprising:
   a carrier beam on which a flap is mounted, the carrier beam rotatably mounted at a fixed rotational axis, the carrier beam having joined inboard and outboard plates as a multilayer structure with
      an inboard flange and an outboard flange, each having an aperture forming a carrier clevis, and
      a channel extending aft from the carrier clevis through the inboard and outboard plates, the channel having an upper surface and a lower surface;
   a fuse pin received through the aperture in each flange; and,
   a coupler link attached to an actuator at a first end and pivotally engaged to the carrier beam by the fuse pin, wherein extension of the coupler link by the actuator rotates the carrier beam from a stowed position to a deployed position;
   wherein, responsive to a moment induced on the flap and carrier beam by a ground contact load, the fuse pin is frangible to shear releasing the coupler link to translate into the channel, the upper surface and lower surface of the channel adapted to deflect the coupler link for continuing translation through the channel.

2. The flap actuation mechanism of claim 1 wherein the carrier beam is rotatably attached at a lower vertex with an axle to a trailing clevis on a flap support extending from a wing, the axle providing the fixed rotational axis for rotation of the flap relative to the wing.

3. The flap actuation mechanism of claim 1 wherein carrier clevis pivotally engages a trailing end of the coupler link with the fuse pin.

4. The flap actuation mechanism of claim 1 wherein the in board flange and outboard flanges comprise an inboard bulbed flange and an outboard bulbed flange extending from a forward surface on the carrier beam, the inboard and outboard bulbed flanges providing clearance of the coupler link from the forward surface during rotation of the carrier beam between the stowed and deployed positions.

5. The flap actuation mechanism of claim 1 wherein the channel is aligned with the coupler link in the stowed position.

6. The flap actuation mechanism of claim 5 wherein the channel diverges from a forward end to an aft end.

7. The flap actuation mechanism of claim 1 wherein the channel is in alignment with the coupler link in the stowed position, the channel diverging from a forward end to an aft end.

8. The flap actuation mechanism of claim 1 wherein the multilayer of the carrier beam is at least three layers with the channel forged, machined, molded, or cast into a central layer.

9. An aircraft having a flap system comprising:
   a wing with a flap support having a trailing clevis;
   a flap;
   a carrier beam on which the flap is mounted, the carrier beam rotatably attached at a lower vertex with an axle to the trailing clevis, the axle providing a fixed rotational axis for rotation of the flap relative to the wing, the carrier beam having a carrier clevis extending from a forward surface and a channel extending aft through the carrier beam from the carrier clevis;
   a fuse pin received in the carrier clevis;
   a coupler link attached to an actuator at a first end and pivotally engaged to the carrier beam by the fuse pin, wherein extension of the coupler link by the actuator rotates the carrier beam from a stowed position to a deployed position and the fuse pin is frangible to shear releasing the coupler link to translate into the channel responsive to a moment induced on the flap and carrier beam by a ground contact load, the channel having an upper surface and a lower surface adapted to deflect the coupler, link for continuing translation through the channel.

10. The aircraft having the flap system of claim 9 wherein the actuator has a drive arm pivotally attached to a leading end of the coupler link whereby rotation of the actuator rotates the drive arm to extend the coupler link.

11. The aircraft having the flap system of claim 9 wherein the carrier beam comprises an inboard plate joined to an outboard plate with the carrier clevis formed by an inboard bulbed flange and an outboard bulbed flange extending from the forward surface of the joined inboard plate and outboard plate, the inboard and outboard bulbed flanges providing clearance of the coupler link from the forward surface during rotation of the carrier beam between the stowed and deployed positions.

12. The aircraft having the flap system of claim 11 wherein the channel diverges from a forward end to an aft end.

13. The aircraft having the flap system of claim 9 wherein the flap support comprises an inboard rib and an outboard rib, the actuator supported between the inboard rib and the outboard rib and the inboard rib and the outboard rib forming the trailing clevis.

14. The aircraft having the flap system of claim 9 wherein the carrier beam is a three layer structure with the channel forged, machined, molded, or cast into a central layer.

15. A method for relieving load on a flap carrier beam, the method comprising:
   mounting a flap on a carrier beam;
   rotatably mounting the carrier beam at a fixed rotational axis, the carrier beam having joined inboard and outboard plates as a multilayer structure with a pair of flanges each flange having an aperture, and a channel extending aft from the pair of flanges and having an upper surface and a lower surface;

attaching a coupler link an actuator at a first end;

pivotally engaging the coupler link to the carrier beam with a fuse pin;

extending the coupler link with the actuator to rotate the carrier beam from a stowed position to a deployed position;

shearing the fuse pin responsive to a moment induced on the flap and carrier beam by a ground contact load;

releasing the coupler link; and translating the coupler link into the channel.

16. The method of claim 15 wherein the step of attaching the coupler link comprises;

pivotally attaching the coupler link at a forward end to a drive arm;

and the step of extending the coupler link comprises:

rotating the drive arm with the actuator to extend the coupler link.

17. The method of claim 15 wherein the step of rotatably mounting the carrier beam comprises:

rotatably attaching a lower vertex of the carrier beam with an axle to a trailing clevis on a flap support extending from a wing, the axle providing the fixed rotational axis for rotation of the flap relative to the wing.

18. The method of claim 15 wherein the step of translating the coupler link further comprises:

rotating the carrier beam from the deployed to the stowed position after shearing the fuse pin; and, pivoting the coupler link about a pivot pin at a forward end.

19. The method of claim 18 further comprising:

deflecting a trailing end of the coupler link by contact with either the upper surface or the lower surface of the channel to deflect the coupler link for continuing translation through the channel.

20. The method of claim 18 further comprising:

preventing fracture of the pivot pin; and thereby minimizing any detrimental effect to the actuator, flap support or other structure in a wing on which the carrier beam and flap are mounted.

* * * * *

UNITED STATES PATENT AND TRADEMARK OFFICE
CERTIFICATE OF CORRECTION

PATENT NO. : 11,427,301 B2
APPLICATION NO. : 16/900630
DATED : August 30, 2022
INVENTOR(S) : Kevin R. Tsai It is certified that error appears in the above-identified patent and that said Letters Patent is hereby corrected as shown below:

In the Claims

Claim 8 is corrected to read:
8. The flap actuation mechanism of claim 1 wherein the multilayer structure of the carrier beam is at least three layers with the channel forged, machined, molded, or cast into a central layer.

Signed and Sealed this
Thirty-first Day of January, 2023

Katherine Kelly Vidal
*Director of the United States Patent and Trademark Office*